US011582072B1

(12) United States Patent
Chung et al.

(10) Patent No.: US 11,582,072 B1
(45) Date of Patent: Feb. 14, 2023

(54) AC-COUPLED COMMUNICATION ENCODING FOR ZERO DC OFFSET

(71) Applicant: Neuralink Corp., Fremont, CA (US)

(72) Inventors: SungWon Chung, Fremont, CA (US); Dongjin Seo, Mountain View, CA (US)

(73) Assignee: NEURALINK CORP., Fremont, CA (US)

( * ) Notice: Subject to any disclaimer, the term of this patent is extended or adjusted under 35 U.S.C. 154(b) by 0 days.

(21) Appl. No.: 17/494,789

(22) Filed: Oct. 5, 2021

(51) Int. Cl.

| | |
|---|---|
| ***H04B 1/04*** | (2006.01) |
| ***H04B 1/16*** | (2006.01) |
| ***H04L 25/02*** | (2006.01) |
| ***H04B 13/00*** | (2006.01) |

(52) U.S. Cl.
CPC .......... *H04L 25/0284* (2013.01); *H04B 1/04* (2013.01); *H04B 13/005* (2013.01)

(58) Field of Classification Search
CPC ..... H04L 25/0284; H04B 1/04; H04B 13/005; H04B 1/16
See application file for complete search history.

(56) References Cited

U.S. PATENT DOCUMENTS

| | | | | |
|---|---|---|---|---|
| 7,199,728 B2 | 4/2007 | Dally et al. | | |
| 7,689,176 B2 | 3/2010 | Crivelli | | |
| 2001/0017724 A1* | 8/2001 | Miyamoto | ......... | H04B 10/5051 398/128 |

* cited by examiner

*Primary Examiner* — David S Huang
(74) *Attorney, Agent, or Firm* — Kilpatrick Townsend & Stockton LLP

(57) ABSTRACT

A three-level encoding transmitter is disclosed in which a transmitter circuit is configured to receive an input data signal including binary data and transmit an encoded data signal. The transmitter circuit can include an inverter circuit configured transmit first and second voltages for each logical level of the binary data. A transmission control circuit can cause the inverter circuit to transmit the voltages or deactivate the inverter circuit based on a first control signal. The transmitter circuit can further include an idle circuit configured to transmit an idle voltage between the first and second voltages when there is no data transmission. The idle circuit may transmit the idle voltage based on a second control signal. The first and second control signals may be configured to only be active when the other is inactive.

20 Claims, 6 Drawing Sheets

AC-COUPLED COMMUNICATION ENCODING FOR ZERO DC OFFSET

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

BACKGROUND

1. Field of the Invention

Embodiments of the present disclosure generally relate to electronic circuit designs. More specifically, embodiments relate to integrated circuit design for serial data transmission and reception.

1. Description of the Related Art

Implantable devices can be implanted into neurological tissue, such as the brain, to form a brain-computer interface. In certain instances, the implantable devices can contain a conduits enabling transmission and/or reception of data collected from neuronal signals between one or more transmitting and receiving devices.

Transmitting electrical signals within the human body, and especially near neural tissue, is inherently risky due to the possibility of current leaking from the electrical cables used to carry the electrical signals. To mitigate this risk, the Direct Current (DC) level of the implanted cables should be as close to zero as possible. In other words, the DC level of the electrical signals on the cable should be approximately the same as the ground potential of the implanted device. In some cases, differential signals are used to transmit data that has been encoded according to various DC-balancing encoding schemes.

However, power consumption is often a primary constraint in neural implants, as neural implants often do not have access to a constant source of power or even large battery sources. Accordingly, reducing the power consumed by transmitting data between devices while maintaining a zero DC offset within the cables may improve the overall viability of neural implants as brain-computer interfaces.

BRIEF SUMMARY

Generally, integrated circuit components can be configured to receive a digital signal including binary data and encode the binary data using a three-level encoding scheme. The encoded data can then be transmitted using a pair of differential signals. The integrated circuit components can include a non-overlapping control signal generator configured to produce control signals that are only active when the other signal is inactive. The control signals can be used to control components of transmitter circuits so that each component is only active when the other component is inactive. A transmitter circuit may be used for each differential signal of the pair of differential signals. Each transmitter circuit can include an inverter circuit controlled by a control signal and configured to receive a binary data signal and produce an encoded signal with a first voltage for logical '0' and a second voltage for logical '1'. Each transmitter circuit can also include an idle circuit controlled by a separate control signal and configured to produce an idle voltage between the first and second voltages when there is no data for transmission. Using a middle voltage for no data transmission allows the transmitter circuits to achieve virtually zero power consumption when there is no data to transmit while still maintaining a zero DC offset on transmission cables.

Further, a receiver circuit can be configured to receive the pair of differential signals including the three-level encoded data and decode the original binary data from the encoded data. The receiver circuit can include an inverter circuit for each differential signal of the pair of differential signals. The inverter circuits can include a p-type transistor and an n-type transistor. The size of the p-type transistor and the size of the n-type transistor may be selected such that when the inverter circuits receive the idle voltage level from the differential signals, both transistors will be inactive, thereby achieving zero power consumption. When the inverter circuits receive either the first voltage or the second voltage from the differential signals, the inverter circuit produces the logical inverse as an output.

The present disclosure is related to a three-level encoding transmitter including a non-overlapping control signal generator configured to generate a first control signal and a second control signal, wherein when the first control signal is active, the second control signal is inactive, and when the second control signal is active, the first control signal is inactive. The three-level encoding transmitter may further include a data input configured to receive an input data signal including binary data. The three-level encoding transmitter may further include a first transmitter circuit including an inverter circuit configured to receive the input data signal and generate a first encoded data signal including a first voltage for logical one and a second voltage for logical zero, wherein the first encoded data signal is the logical inverse of the binary data. The first transmitter circuit may further include a transmission control circuit configured to receive the first control signal from the non-overlapping control signal generator and control the inverter circuit based on the first control signal, wherein when the first control signal is active, the transmission control circuit causes the inverter circuit to transmit the first encoded data signal to an output of the first transmitter circuit, and when the first control signal is inactive, the transmission control circuit deactivates the inverter circuit. The first transmitter circuit may further include an idle circuit configured to receive the second control signal from the non-overlapping control signal generator and generate an idle voltage between the first voltage and the second voltage based on the second control signal, wherein when the second control signal is active, the idle circuit transmits the idle voltage to the output of the first transmitter circuit.

In a further embodiment, the three-level encoding transmitter further includes a second transmitter circuit configured to receive the input data signal and generate a second encoded data signal, wherein the second encoded data signal has an opposite polarity to the first encoded data signal relative to a common mode voltage.

In a further embodiment, the input data signal is inverted prior to being received by the second transmitter circuit.

In some embodiments, the inverter circuit includes a first p-type transistor and a first n-type transistor, wherein a drain of the first p-type transistor is connected to a drain of the first n-type transistor at an output of the inverter circuit, and the data input is connected to a gate of the first p-type transistor and a gate of the first n-type transistor.

In some embodiments, the transmission control circuit includes a second p-type transistor, wherein a drain of the second p-type transistor is connected to a source of the first p-type transistor. The transmission control circuit may further include a second n-type transistor, wherein a drain of the second n-type transistor is connected to a source of the first n-type transistor and a gate of the second n-type transistor receives the first control signal. The transmission control circuit may further include an inverter configured to transmit an inverted first control signal to a gate of the second p-type transistor.

In some embodiments, the first and second p-type transistors and the first and second n-type transistors are each metal-oxide-semiconductor field-effect transistors.

In some embodiments, the idle circuit includes an inverter configured to output an inverted second control signal. The idle circuit may further include a first p-type transistor, wherein a source of the first p-type transistor is connected to a source of the idle voltage, a drain of the first p-type transistor is connected to the output of the first transmitter circuit, and a gate of the first p-type transistor receives the inverted second control signal. The idle circuit may further include a first n-type transistor, wherein a drain of the first p-type transistor is connected to the source of the idle voltage, a source of the first n-type transistor is connected to the output of the first transmitter circuit, and a gate of the first n-type transistor receives the second control signal.

In a further embodiment, the three-level encoding transmitter includes a receiver circuit coupled with the output of the first transmitter circuit and configured to reproduce the binary data at an output of the receiver circuit, wherein when the receiver circuit receives the idle voltage, the receiver circuit is inactive.

In some embodiments, the receiver circuit is capacitively coupled with the first transmitter circuit.

In some embodiments, the receiver circuit includes a first inverter circuit coupled with the output of the first transmitter circuit and configured to produce a first decoded data signal, wherein the first decoded data signal is the logical inverse of the first encoded data signal. The receiver circuit may further include a second inverter circuit coupled with an output of the second transmitter circuit and configured to produce a second decoded data signal, wherein the second decoded data signal is the logical inverse of the second encoded data signal. The receiver circuit may further include a differential-to-single ended level-up voltage shifter configured to receive the first and second decoded data signals and transmit an output data signal to the output of the receiver circuit, wherein the output data signal is logically equivalent to the binary data of the input data signal.

In some embodiments, the input data signal is received from a neural implant.

Some embodiments of the present disclosure are related to a three-level decoding receiver including a first input configured to receive a first encoded data signal including a first voltage level, a second voltage level, and a third voltage level, the second voltage level being less than the third voltage level and more than the first voltage level. The three-level decoding receiver may further include a first inverter circuit coupled with the first input and configured to generate a first decoded data signal from the first encoded data signal, wherein when the first encoded signal is the first voltage level, the first decoded data signal represents a logical one, when the first encoded signal is the third voltage level, the first decoded data signal represents a logical zero, and when the first encoded signal is the second voltage level, the first inverter circuit is inactive.

In a further embodiment, the three-level decoding receiver may further include a second input configured to receive a second encoded data signal, wherein the second encoded data signal has an opposite polarity to the first encoded data signal relative to a common mode voltage. The three-level decoding receiver may further include a second inverter circuit coupled with the second input and configured to generate a second decoded data signal from the second encoded data signal, wherein the second decoded data signal is the logical inverse of the first decoded data signal and when the first decoded data signal is inactive, the second inverter circuit is inactive. The three-level decoding receiver may further include a differential-to-single ended level-up voltage shifter configured to receive the first and second decoded data signals and transmit an output data signal to an output of the receiver circuit.

In some embodiments, the first encoded data signal and the second encoded data signal are direct current balanced.

In some embodiments, the first inverter circuit includes a p-type transistor and an n-type transistor, wherein a drain of the p-type transistor is connected to a drain of the n-type transistor at an output of the first inverter circuit, and a gate of the p-type transistor and a gate of the n-type transistor are connected to the first input. In some embodiments, a size of the p-type transistor is not equal to a size of the n-type.

In some embodiments, the size of the p-type transistor and the size of the n-type transistor are different by a factor of at least five.

In some embodiments, when the first inverter circuit is inactive, the first inverter circuit consumes zero power.

In a further embodiment, the three-level decoding receiver further includes a transmitter circuit capacitively coupled with the first and second inputs and configured to generate the first and second encoded data signals.

In some embodiments, the transmitter circuit includes a non-overlapping control signal generator configured to generate a first control signal and a second control signal, wherein when the first control signal is active, the second control signal is inactive, and when the second control signal is active, the first control signal is inactive. The transmitter circuit may further include a data input configured to receive an input data signal including binary data. The transmitter circuit may further include a first transmitter circuit configured to generate a first encoded data signal based on the input data signal, wherein the first encoded data signal is the logical inverse of the binary data and when the first control signal is active, the first transmitter circuit transmits at either the first voltage or the third voltage, and when the second control signal is active, the first transmitter circuit transmits the second voltage. The transmitter circuit may further include a second transmitter circuit configured to generate the second encoded data signal based on the input data signal, wherein the second encoded data signal is the logical equivalent of the binary data and when the first control signal is active, the second transmitter circuit transmits at either the first voltage or the third voltage, and when the second control signal is active, the second transmitter circuit transmits the second voltage.

Some embodiments of the present disclosure are related to a three-level encoding apparatus including a non-overlapping control signal generator configured to generate a first control signal and a second control signal, wherein when the first control signal is active, the second control signal is inactive, and when the second control signal is active, the first control signal is inactive. The three-level encoding apparatus may further include a data input configured to receive an input data signal including binary data. The three-level encoding apparatus may further include a first inverter circuit configured to receive the input data signal and generate a first encoded data signal including a first voltage for logical one and a second voltage for logical zero, wherein the first encoded data signal is the logical inverse of the binary data. The three-level encoding apparatus may further include an input inverter configured to receive the input data signal and generate an inverse input data signal. The three-level encoding apparatus may further include a second inverter circuit configured to receive the inverse input data signal and generate a second encoded data signal including the first voltage for logical one and the second voltage for logical zero, wherein the second encoded data signal is logically equivalent to the binary data. The three-level encoding apparatus may further include a first transmission control circuit configured to receive the first control signal from the non-overlapping control signal generator and control the first inverter circuit based on the first control signal, wherein when the first control signal is active, the first transmission control circuit causes the first inverter circuit to transmit the first encoded data signal to a first output, and when the first control signal is inactive, the first transmission control circuit deactivates the first inverter circuit. The three-level encoding apparatus may further include a second transmission control circuit configured to receive the first control signal from the non-overlapping control signal generator and control the second inverter circuit based on the first control signal, wherein when the first control signal is active, the second transmission control circuit causes the second inverter circuit to transmit the second encoded data signal to a second output, and when the first control signal is inactive, the second transmission control circuit deactivates the second inverter circuit. The three-level encoding apparatus may further include a first idle circuit configured to receive the second control signal from the non-overlapping control signal generator and generate an idle voltage between the first voltage and the second voltage based on the second control signal, wherein when the second control signal is active, the first idle circuit transmits the idle voltage to the first output. The three-level encoding apparatus may further include a second idle circuit configured to receive the second control signal from the non-overlapping control signal generator and generate the idle voltage, wherein when the second control signal is active, the second idle circuit transmits the idle voltage to the second output. The three-level encoding apparatus may further include a third inverter circuit capacitively coupled with the first output and configured to generate a first decoded data signal from the first encoded data signal, wherein when the first encoded signal is the first voltage, the first decoded data signal represents a logical zero, when the first encoded data signal is the second voltage, the first decoded data signal represents a logical one, and when the first encoded signal is the idle voltage, the third inverter circuit is inactive. The three-level encoding apparatus may further include a fourth inverter circuit capacitively coupled with the second output and configured to generate a second decoded data signal from the second encoded data signal, wherein when the second encoded data signal is the first voltage, the second decoded data signal represents a logical zero, when the second encoded data signal is the second voltage, the second decoded data signal represents a logical one, and when the second encoded signal is the idle voltage, the fourth inverter circuit is inactive. The three-level encoding apparatus may further include a differential-to-single ended level-up voltage shifter configured to receive the first and second decoded data signals and transmit an output data signal to a third output, wherein the output data signal is logically equivalent to the binary data of the input data signal.

BRIEF DESCRIPTION OF THE DRAWINGS

A further understanding of the nature and advantages of various embodiments may be realized by reference to the following figures. In the figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Advancements in electronics, including increased processing power, increased data generation and collection, and transmission capabilities, have enabled new possibilities and applications previously unthinkable in the past. However, while these advancements continue to take place, there are constant pressures in many fields to consume less power while maintaining a high level of performance and data transmission rates.

This is especially true in the field of neural implants. However, due to their placement within close proximity to highly sensitive neural tissue, there are additional constraints compared with other data transmission applications. These constraints are largely due to potential health risks caused by current leaking from a transmission cable into the surrounding tissue and causing damage. Typically, these risks are addressed using DC-balancing data encoding schemes that balance the number of high and low voltages transmitted over the cable. However, these solutions often require continuous toggling between the voltage levels, even when there is no data for transmission. Because both the transmitter and receiver must continuously operate and cannot be turned off, this leads to unnecessary power consumption.

Embodiments of the present disclosure address these challenges using novel circuit designs to encode and transmit the data using differential signals with three voltage levels. The three voltage levels may include a first voltage level for logical '0', a second voltage level for logical '1', and an idle voltage level between the first and second voltages when there is no data to transmit. Transmitting an idle voltage level set to a common mode voltage may allow the transmitter circuits to achieve virtually zero power consumption when there is no data transmission. Novel receiver circuits may also be used to receive the differential signals such that when the idle voltage is transmitted to the receiver circuit, the receiver circuit consumes virtually zero power as well.

Further detail regarding three-level encoding and decoding circuits is provided in relation to the figures.

Figure 1:
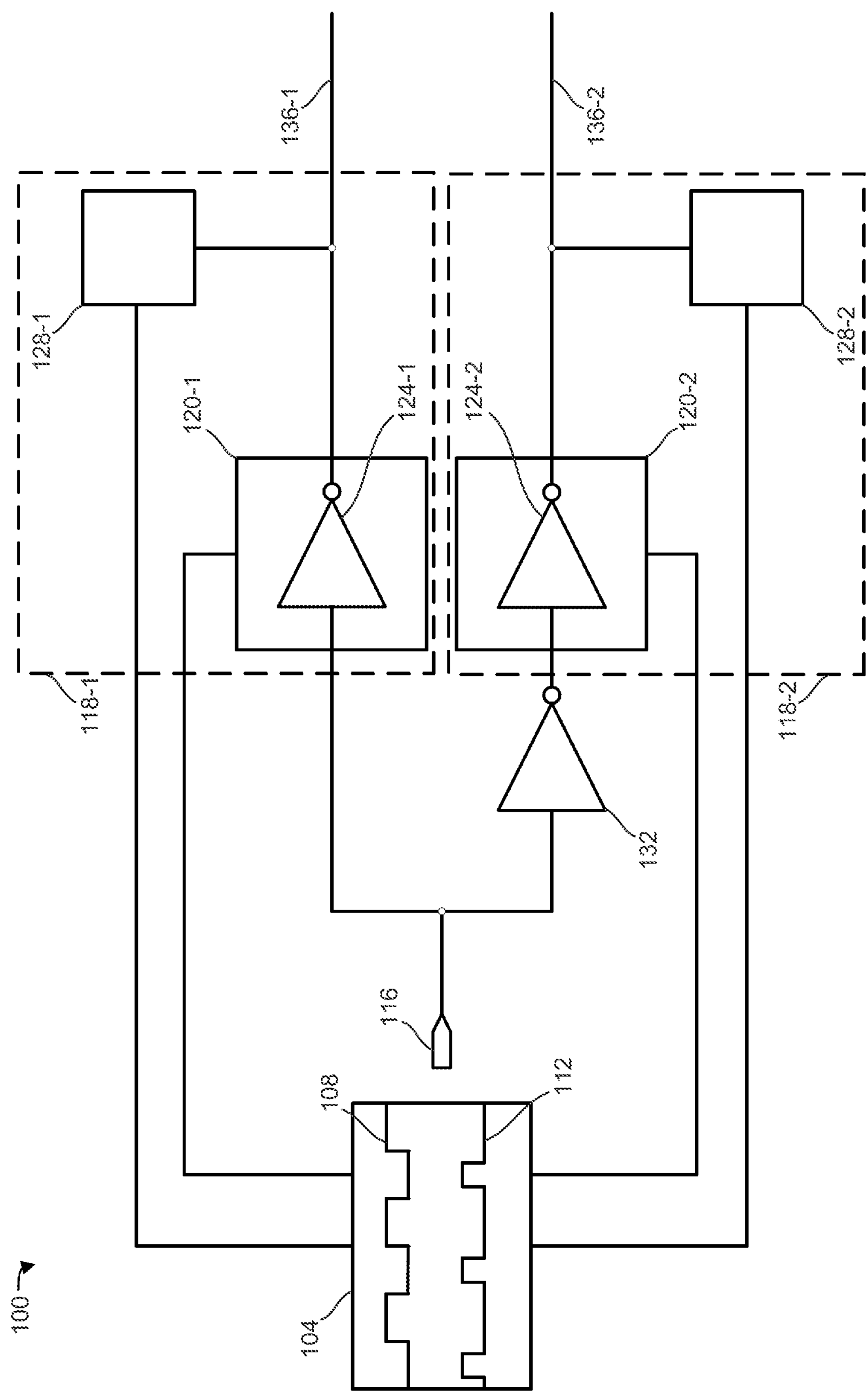
FIG. 1 illustrates a block diagram of a three-level encoding transmitter, according to embodiments of the present disclosure.

FIG. 1 illustrates a block diagram of a three-level encoding transmitter 100, according to embodiments of the present disclosure. Three-level encoding transmitter 100 includes non-overlapping control signal generator 104, data input 116, transmitter circuits 118-1 and 118-2, and outputs 136-1 and 136-2. Non-overlapping control signal generator 104 and data input 116 are electrically coupled as inputs to transmitter circuits 118-1 and 118-2. Transmitter circuits 118-1 and 118-2 are electrically coupled to outputs 136-1 and 136-2 of three-level encoding transmitter 100. Three-level encoding transmitter 100 is configured to receive an input data signal via data input 116, encode the data signal, and transmit the encoded data signal as a differential signal via outputs 136-1 and 136-2.

In some embodiments, outputs 136-1 and 136-2 of three-level encoding transmitter 100 may be electromagnetically coupled with a three-level decoding receiver, as described further below. For example, outputs 136-1 and 136-2 may be capacitively coupled with inputs of a three-level decoding receiver. The three-level decoding receiver may be configured to receive the encoded data signal and reproduce the original data from the input data signal.

Three-level encoding transmitter 100 may be a component of a neural implant and/or neural implant system including a neural implant. For example, one or more processors configured to generate digital data from neuronal impulses sensed within a human brain may transmit the digital data to data input 116. Three-level encoding transmitter 100 may then transmit an encoded version of the digital data to a three-level decoding receiver. The three-level decoding receiver may be part of a data receiving device outside the human. Alternatively, the three-level decoding receiver may be part of a separate implant in another location within the human's body.

The differential encoded data signal produced by three-level encoding transmitter 100 may include two differential signals configured to be DC-balanced such that the differential signals have opposite polarity relative to a common mode voltage. For example, a first differential signal may be transmitted via first output 136-1 while a second differential signal is transmitted via second output 136-2. Each differential signal may include two logical levels and/or voltages corresponding to logical values included in the data signal. As an example, for a binary data signal with logical '0' and logical '1', each differential signal may include a first voltage level for logical '0' and a second voltage level for logical '1'. Each differential signal may further include a third logical level and/or voltage when there is no data transmission. The third voltage level may be between the first and second voltage levels and/or may be a common mode voltage. The third voltage level for each differential signal may be selected to reduce and/or eliminate power consumption by the three-level encoding transmitter when there is no data transmission.

Non-overlapping control signal generator 104 is an electrical component and/or a combination of components configured to generate first control signal 108 and second control signal 112. Non-overlapping control signal generator 104 is further configured to generate first control signal 108 and second control signal 112 such that when first control signal 108 is active, second control signal 112 is inactive, and when second control signal 112 is active, first control signal 108 is inactive. As illustrated, first control signal 108 and second control signal 112 are periodic square waveforms with amplitudes alternating at a steady frequency between fixed minimum and maximum voltages. When a control signal is at the fixed minimum voltage, it is considered to be inactive, and when a control signal is at the fixed maximum voltage, it is considered to be active. As further illustrated, first control signal 108 and second control signal 112 are generated such that each control signal is at the maximum voltage only when the other control signal is at the minimum voltage. First control signal 108 has a duty cycle equal to or greater than a duty cycle of second control signal 112.

While illustrated as periodic waveforms, first control signal 108 and second control signal 112 may be non-periodic signals without defined duty cycles. For example, the generation of first control signal 108 and second control signal 112 may be controlled be a separate control signal wherein when the separate control signal is active, non-overlapping control signal generator 104 causes first control signal 108 to be active and second control signal 112 to be inactive, and wherein when the separate control signal is inactive, non-overlapping control signal generator 104 causes first control signal 108 to be inactive and second control signal 112 to be active. The separate control signal may alternate between active and inactive at regular intervals. Alternatively, the separate control signal may appear to follow a random or semi-random pattern as determined by one or more control circuits or data transmission processors.

First control signal 108 and second control signal 112 are configured as inputs to one or more components and/or functions of three-level encoding transmitter 100. For example, first control signal 108 is configured as an input to control a data transmission function of three-level encoding transmitter 100 while second control signal 112 is configured as an input to control a power saving function of three-level encoding transmitter 100, as further described below. By configuring first control signal 108 and second control signal 112 to be active during non-overlapping times, the components and/or functions controlled by second control signal 112 will not be active when the components and/or functions controlled by first control signal 108 are active. Similarly, the components and/or functions controlled by first control signal 108 will not be active when the components and/or functions controlled by second control signal 112 are active.

In some embodiments, non-overlapping control signal generator 104 may generate one or more additional non-overlapping control signals. A person skilled in the art would understand that any number of non-overlapping control signals may be generated by non-overlapping control signal generator 104 include 3 signals, 4 signals, 5 signals, or any suitable number of control signals. Additional control signals may be configured to overlap with only certain of the other control signals while not overlapping with other control signals. In some embodiments, the additional control signals may each be configured to control a component and/or function of three-level encoding transmitter 100.

Transmitter circuits 118-1 and 118-2 are electrically coupled with non-overlapping control signal generator 104 and data input 116. For example, transmitter circuits 118-1 and 118-2 are configured to receive, as inputs, first control signal 108 and second control signal 112 from non-overlapping control signal generator 104 as well as an input data signal from data input 116. Transmitter circuits 118-1 and 118-2 are further electrically coupled with outputs 136-1 and 136-2 of three-level encoding transmitter.

As illustrated, transmitter circuits 118-1 and 118-2 include first transmitter circuit 118-1 and second transmitter circuit 118-2. Transmitter circuits 118-1 and 118-2 further include inverter circuits 124-1 and 124-2, transmission control circuits 120-1 and 120-2, and idle circuits 128-1 and 128-2. First transmitter circuit 118-1 includes some or all of the same components as second transmitter circuit 118-2. For example, first transmitter circuit 118-1 includes: first inverter circuit 124-1; first transmission control circuit 120-1; and first idle circuit 128-1, while second transmitter circuit 118-2 includes: second inverter circuit 124-2; second transmission control circuit 120-2, and second idle circuit 128-2.

In some embodiments, three-level encoding transmitter 100 includes more than two transmitter circuits 118-1 and 118-2. For example, three-level encoding transmitter 100 may include 4, 6, 8 or any suitable even number of transmitter circuits 118-1 and 118-2. Each pair of transmitter circuits may include a first transmitter circuit with the same or similar components as first transmitter circuit 118-1 and a second transmitter circuit with the same or similar components as second transmitter circuit 118-2.

Data input 116 is electrically coupled with inverter circuits 124-1 and 124-2. The input data signal received from data input 116 is coupled with second inverter circuit 124-2 via a third inverter circuit 132. Third inverter circuit 132 may be the same and/or function in a similar manner as inverter circuits 124-1 and 124-2, as described below. A first output of non-overlapping control signal generator 104, configured to output first control signal 108, is electrically coupled with transmission control circuits 120. A second output of non-overlapping control signal generator 104, configured to output second control signal 112, is electrically coupled with idle circuits 128-1 and 128-2. Outputs of inverter circuits 124-1 and 124-2 and outputs of idle circuits 128-1 and 128-2 are electrically coupled together with outputs 136-1 and 136-2 of three-level encoding transmitter 100.

Transmitter circuits 118-1 and 118-2 are configured to receive an input data signal including binary data and generate a pair of three-level encoded differential signals, as described above. For example, first transmitter circuit 118-1 is configured to receive a binary input data signal from data input 116 and generate a first three-level encoded signal of the pair of three-level encoded differential signals and transmit the first three-level encoded signal via first output 136-1. Similarly, second transmitter circuit 118-2 is configured to receive the binary input data signal from data input 116 and generate a second three-level encoded signal with an opposite polarity to the first three-level encoded signal relative to a common mode voltage and transmit the second three-level encoded signal via second output 136-2.

Inverter circuits 124-1 and 124-2 are configured to receive an input data signal including binary data and generate an encoded output data signal including the logical inverse of the original binary data. For example, upon receiving a logical '1', inverter circuits 124-1 and 124-2 are configured to produce a logical '0', and upon receiving a logical '0', inverter circuits 124-1 and 124-2 are configured to produce a logical '1'. The encoded output data signal may represent logical '0' and logical '1' using a first voltage and a second voltage, as described above.

In some embodiments, the relative voltages used to represent the logical '0' and the logical '1' of the input data signal do not match the relative voltages used to represent the logical '1' and the logical '1' of the output data signal. For example, the voltage differential between logical '0' and logical '1' of the input data signal may be larger or smaller than the voltage differential between logical '0' and logical '1' of the output data signal.

Third inverter circuit 132 may invert the input data signal before second inverter circuit 124-2 receives it. By inverting the input data signal by third inverter circuit 132 before second inverter circuit 124-2 generates the encoded output data signal, the encoded output data signal may represent the logical equivalent of the input data signal and the logical inverse of the encoded output data signal generated by first inverter circuit 124-1.

Transmission control circuits 120-1 and 120-2 are configured to receive first control signal 108 from non-overlapping control signal generator 104 and control inverter circuits 124-1 and 124-2 based on first control signal 108. When first control signal 108 is active, transmission control circuits 120-1 and 120-2 cause inverter circuits 124-1 and 124-2 to generate the encoded output data signal, and when first control signal 108 is inactive, transmission control circuits 120-1 and 120-2 deactivate the inverter circuits 124-1 and 124-2. Causing inverter circuits 124-1 and 124-2 to either generate the encoded output data signal or be deactivated may include providing a connection between inverter circuits 124-1 and 124-2 and a power source and/or a source of ground when first control signal 108 is active and disconnecting inverter circuits 124-1 and 124-2 from the source of power and/or source of ground when first control signal is inactive.

Idle circuits 128-1 and 128-2 are configured to receive second control signal 112 from non-overlapping control signal generator 104 and generate an idle voltage between the first voltage and the second voltage generated by inverter circuits 124-1 and 124-2 based on second control signal 112. When second control signal 112 is active, idle circuits 128-1 and 128-2 will generate and transmit the idle voltage to outputs 136-1 and 136-2. Generating the idle voltage and transmitting it to outputs 136-1 and 136-2 by the idle circuits 128-1 and 128-2 may include providing a connection between outputs 136-1 and 136-2 and a source of the idle voltage when the second control signal is active and disconnecting outputs 136-1 and 136-2 from the source of the idle voltage when the second control signal is inactive. The idle voltage may be a common mode voltage configured to reduce overall power consumption by transmitter circuits 118-1 and 118-2.

Figure 2:
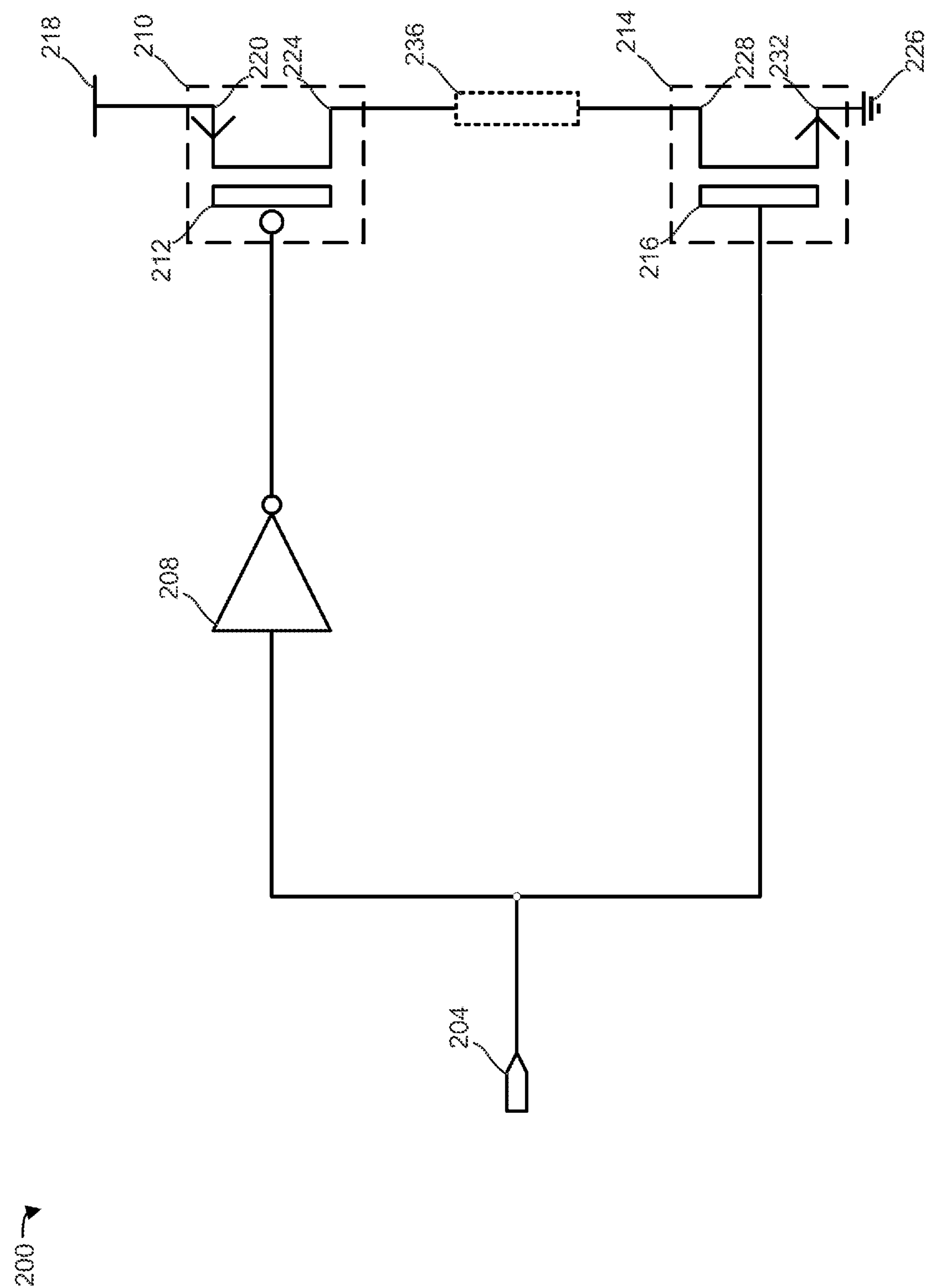
FIG. 2 illustrates a circuit diagram of a transmission control circuit, according to embodiments of the present disclosure.

FIG. 2 illustrates a circuit diagram of a transmission control circuit 200, according to embodiments of the present disclosure. Transmission control circuit 200 may be the same, or function in a similar manner, as the transmission control circuits described above. For example, transmission control circuit 200 is configured to control one or more electrical components based on a control signal.

Transmission control circuit 200 includes a control signal input 204 configured to receive a control signal. The control signal may be a square wave electrical signal that alternates between a maximum voltage and a minimum voltage. The maximum and minimum voltages may be selected based on operating parameters of one or more electrical components of transmission control circuit 200, as described below. Alternatively, or in addition, the operating parameters of the one or more electrical components of transmission control circuit 200 may be selected based on the maximum and minimum voltages provided by the control signal.

Control signal input 204 is coupled with an input of inverter 208. Inverter 208 is configured to produce an inverse of the control signal received by control signal input 204 at an output of inverter 208. For example, when the control signal is at the maximum voltage (e.g., active), an output of inverter 208 will be at the minimum voltage (e.g., inactive), and vice versa.

The output of inverter 208 is coupled to gate 212 of p-type transistor 210. Voltage source 218 is coupled with source 220 of p-type transistor 210. When gate 212 receives a voltage from the output of inverter 208 above an operating threshold, p-type transistor 210 is in an 'off' state and electricity from voltage source 218 will not flow through source 220 to drain 224 of p-type transistor 210. On the other hand, when gate 212 does not receive a voltage, or the voltage is below an operating threshold, p-type transistor 210 is in an 'on' state, and electricity from voltage source 218 may flow from source 220 to drain 224 of p-type transistor 210.

Control signal input 204 is further coupled with gate 216 of n-type transistor 214. A source of ground 226 is coupled with source 232 of n-type transistor 214. When gate 216 receives a voltage from control signal input 204 above an operating threshold, n-type transistor 214 is in an 'on' state and electricity may flow between source 232 and drain 228 of n-type transistor 214. On the other hand, when gate 216 does not receive a voltage, or the voltage is below an operating threshold, n-type transistor 214 is in an 'off' state, and electricity will not flow between source 232 and drain 228 of n-type transistor 214.

P-type transistor 210 and/or n-type transistor 214 may be any suitable type of transistor, such as, but not limited to, Junction Field Effect Transistors (JFET), Insulated Gate Field Effect Transistors (IG-FET), and/or Metal Oxide Semiconductor Field Effect Transistors (MOSFET). While described as having a source, drain, and gate component, one skilled in the art would understand that these terms are interchangeable with emitter, collector, and base.

One or more electrical components 236 are connected between p-type transistor 210 and n-type transistor 214. For example, one or more connections of the one or more electrical components 236 configured to be connected with a voltage source may be connected to drain 224 of p-type transistor 210. Likewise, one or more connections of the one or more electrical components 236 configured to be connected with a source of ground may be connected to drain 228 of n-type transistor 214. The one or more electrical components 236 may include any number and type of electrical components. For example, the one or more electrical components 236 may include additional transistor circuitry, as further described below.

When p-type transistor 210 and n-type transistor 214 are both in the 'on' state, the one or more electrical components 236 are connected to voltage source 218 and the source of ground 226, thereby enabling the one or more electrical components 236 to operate as intended. On the other hand, when p-type transistor 210 and n-type transistor 214 are both in the 'off' state, the one or more electrical components 236 are no longer connected to voltage source 218 or the source of ground 226, thereby deactivating the one or more electrical components 236.

Figure 3:
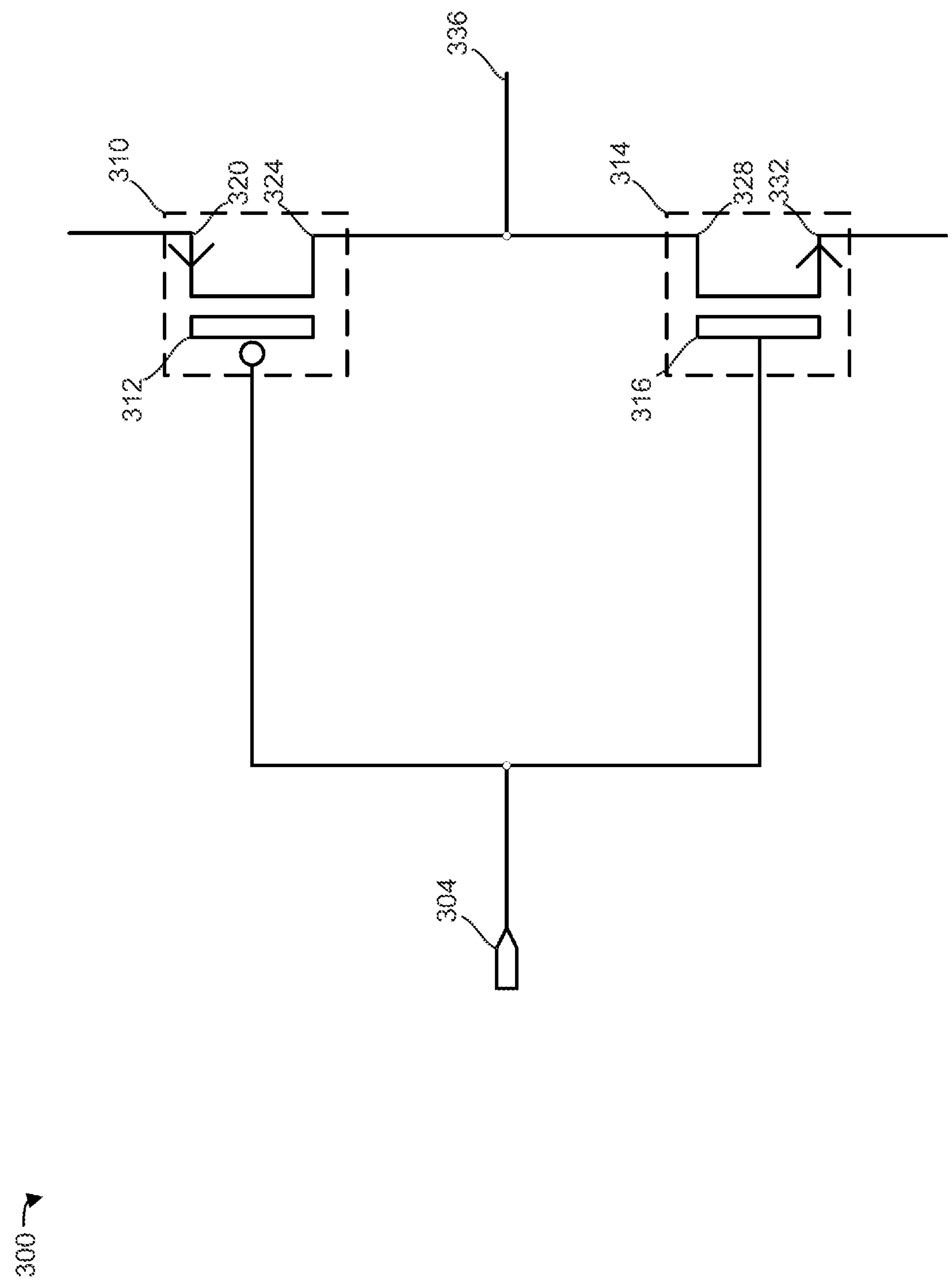
FIG. 3 illustrates a circuit diagram of an inverter circuit, according to embodiments of the present disclosure.

FIG. 3 illustrates a circuit diagram of an inverter circuit 300, according to embodiments of the present disclosure. Inverter circuit 300 may be the same, or function in a similar manner as the inverter circuits described above. For example, inverter circuit 300 is configured to receive an input data signal including binary data and transmit an output data signal including the logical inverse of the input data signal.

Inverter circuit 300 includes data input 304 configured to receive an input data signal including binary data. The input data signal may be a square wave electrical signal that alternates between a maximum voltage, representing logical '1', and a minimum voltage, representing logical '0'. The maximum and minimum voltages may be selected based on operating parameters of one or more electrical components of inverter circuit 300, as described below. Alternatively, or in addition, the operating parameters of the one or more electrical components of inverter circuit 300 may be selected based on the maximum and minimum voltages of the input data signal.

Inverter circuit 300 further includes p-type transistor 310. P-type transistor 310 includes gate 312, source 320, and drain 324. Data input 304 is coupled with gate 312 of p-type transistor 310. When gate 312 receives a voltage from data input 304 above an operating threshold, p-type transistor 310 is in an 'off' state. In the 'off' state, p-type transistor 310 behaves like an open circuit between source 320 and drain 324 such that electricity will not flow between source 320 and drain 324 of p-type transistor 310. On the other hand, when gate 212 does not receive a voltage, or the voltage is below an operating threshold, p-type transistor 210 is in an 'on' state, and electricity may flow between source 320 and drain 324 of p-type transistor 310.

Inverter circuit 300 further includes n-type transistor 314. N-type transistor 314 includes gate 316, source 332, and drain 328. Data input 304 is coupled with gate 316 of n-type transistor 314. When gate 316 does not receive a voltage, or the voltage is below an operating threshold, n-type transistor 314 is in an 'off' state. In the 'off' state, n-type transistor 314 behaves like an open circuit between source 332 and drain 328 such that electricity will not flow between source 320 and drain 328 of n-type transistor 314. On the other hand, when gate 316 receives a voltage equal to or above an operating threshold, n-type transistor 314 is in an 'on' state, and electricity may flow between source 332 and drain 328 of n-type transistor 314.

P-type transistor 310 and/or n-type transistor 314 may be any suitable type of transistor, such as, but not limited to, a Junction Field Effect Transistor (JFET), an Insulated Gate Field Effect Transistor (IG-FET), and/or a Metal Oxide Semiconductor Field Effect Transistor (MOSFET). While described as having a source, drain, and gate, one skilled in the art would understand that these terms are interchangeable with emitter, collector, and base. In some embodiments, the combination of p-type transistor 310 and n-type transistor 314 may be replaced and/or replicated using a Complementary MOSFET (CMOS).

Drain 324 of p-type transistor 310 and drain 328 of n-type transistor 314 are coupled together at data output 336. Gate 312 of p-type transistor 310 and gate 316 of n-type transistor 314 are coupled together at data input 304. Source 320 of p-type transistor 310 may be coupled with a power source while source 332 of n-type transistor 314 may be coupled with a source of ground.

When connected as described above, p-type transistor 310 and n-type transistor 314 will generate an inverse signal at data output 336 compared with the signal received at data input 304. For example, when the input signal received at data input 304 is at the minimum voltage, n-type transistor 314 will be in the 'off' state, thereby limiting the current that can flow from data output 336 to ground. On the other hand, p-type transistor 310 will be in the 'on' state, allowing much more current to flow from a power supply to data output 336 resulting in a small voltage drop from the power supply to data output 336. This small voltage drop will cause data output 336 to register as a high voltage, the inverse of the input signal received at data input 304.

As another example, when the input signal received at data input 304 is at the maximum voltage, p-type transistor 310 will be in the 'off' state, thereby limiting the current that can flow from a power supply to data output 336. On the other hand, n-type transistor 314 will be in the 'on' state, resulting in a small voltage drop from data output 336 to a source of ground. This small voltage drop will cause data output 336 to register as a low voltage, the inverse of the input signal received at data input 304.

Figure 4:
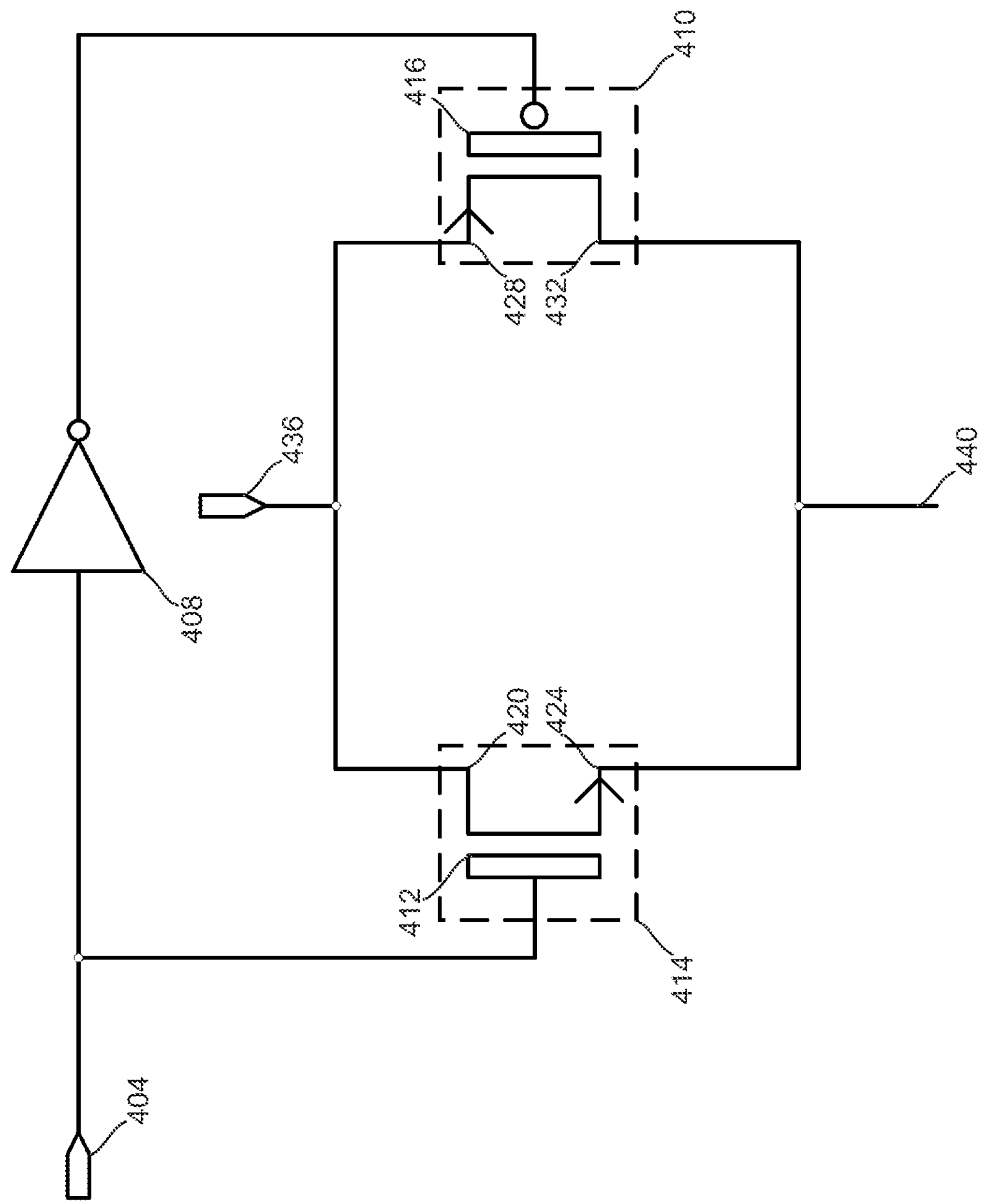
FIG. 4 illustrates a circuit diagram of an idle circuit, according to embodiments of the present disclosure.

FIG. 4 illustrates a circuit diagram of an idle circuit 400, according to embodiments of the present disclosure. Idle circuit 400 includes control signal input 404 configured to receive a control signal. The control signal may be a square wave electrical signal that alternates between a maximum voltage and a minimum voltage. The maximum and minimum voltages may be selected based on operating parameters of one or more electrical components of idle circuit 400, as described below. Alternatively, or in addition, the operating parameters of the one or more electrical components of idle circuit 400 may be selected based on the maximum and minimum voltages provided by the control signal. Idle circuit 400 further includes idle voltage input 436 configured to receive an idle voltage from a source of the idle voltage. The idle voltage may be a common mode voltage from a power supply.

Control signal input 404 is coupled with an input of inverter 408. Inverter 408 is configured to produce an inverse of the control signal received by control signal input 404 at an output of inverter 408. For example, when the control signal is at the maximum voltage (e.g., active), an output of inverter 408 will be at the minimum voltage (e.g., inactive), and vice versa.

Idle circuit 400 further includes p-type transistor 410. P-type transistor 410 includes gate 416, source 428, and drain 432. The output of inverter 408 is coupled with gate 416 of p-type transistor 410. Idle voltage input 436 is coupled with source 428 of p-type transistor 410. When gate 416 receives a voltage from the output of inverter 408 above an operating threshold, p-type transistor 410 is in an 'off' state and electricity from idle voltage input 436 will not flow through source 428 to drain 432 of p-type transistor 410. On the other hand, when gate 416 does not receive a voltage, or the voltage is below an operating threshold, p-type transistor 410 is in an 'on' state, and electricity from idle voltage input 436 may flow from source 428 to drain 432 of p-type transistor 410.

Idle circuit 400 further includes n-type transistor 414. N-type transistor 414 includes gate 412, source 424, and drain 420. Control signal input 404 is coupled with gate 412 of n-type transistor 414. Idle voltage input 436 is coupled with drain 420 of n-type transistor 414. When gate 412 does not receive a voltage, or the voltage is below an operating threshold, n-type transistor 414 is in an 'off' state. In the 'off' state, n-type transistor 414 behaves like an open circuit between source 424 and drain 420 such that electricity will not flow between source 424 and drain 420 of n-type transistor 414. On the other hand, when gate 412 receives a voltage equal to or above an operating threshold, n-type transistor 414 is in an 'on' state, and electricity may flow between source 424 and drain 420 of n-type transistor 414.

P-type transistor 310 and/or n-type transistor 314 may be any suitable type of transistor, such as, but not limited to, a Junction Field Effect Transistor (JFET), an Insulated Gate Field Effect Transistor (IG-FET), and/or a Metal Oxide Semiconductor Field Effect Transistor (MOSFET). While described as having a source, drain, and gate, one skilled in the art would understand that these terms are interchangeable with emitter, collector, and base.

Drain 432 of p-type transistor 410 and source 424 of n-type transistor are coupled together with idle voltage output 440. When connected as described above, inverter 408, p-type transistor 410, and n-type transistor 414 will produce the idle voltage at idle voltage output 440 based on the state of the control signal received at control signal input 404. For example, when the control signal received at control signal input 404 is at the maximum voltage, p-type transistor 410 and n-type transistor 414 will both be in the 'on' state, thereby allowing electricity to flow from idle voltage input 436 to idle voltage output 440. On the other hand, when the control signal received at control signal input 404 is at the minimum voltage, p-type transistor 410 and n-type transistor 414 will both be in the 'off' state and electricity will not flow from idle voltage input 436 to idle voltage output 440.

Figure 5:
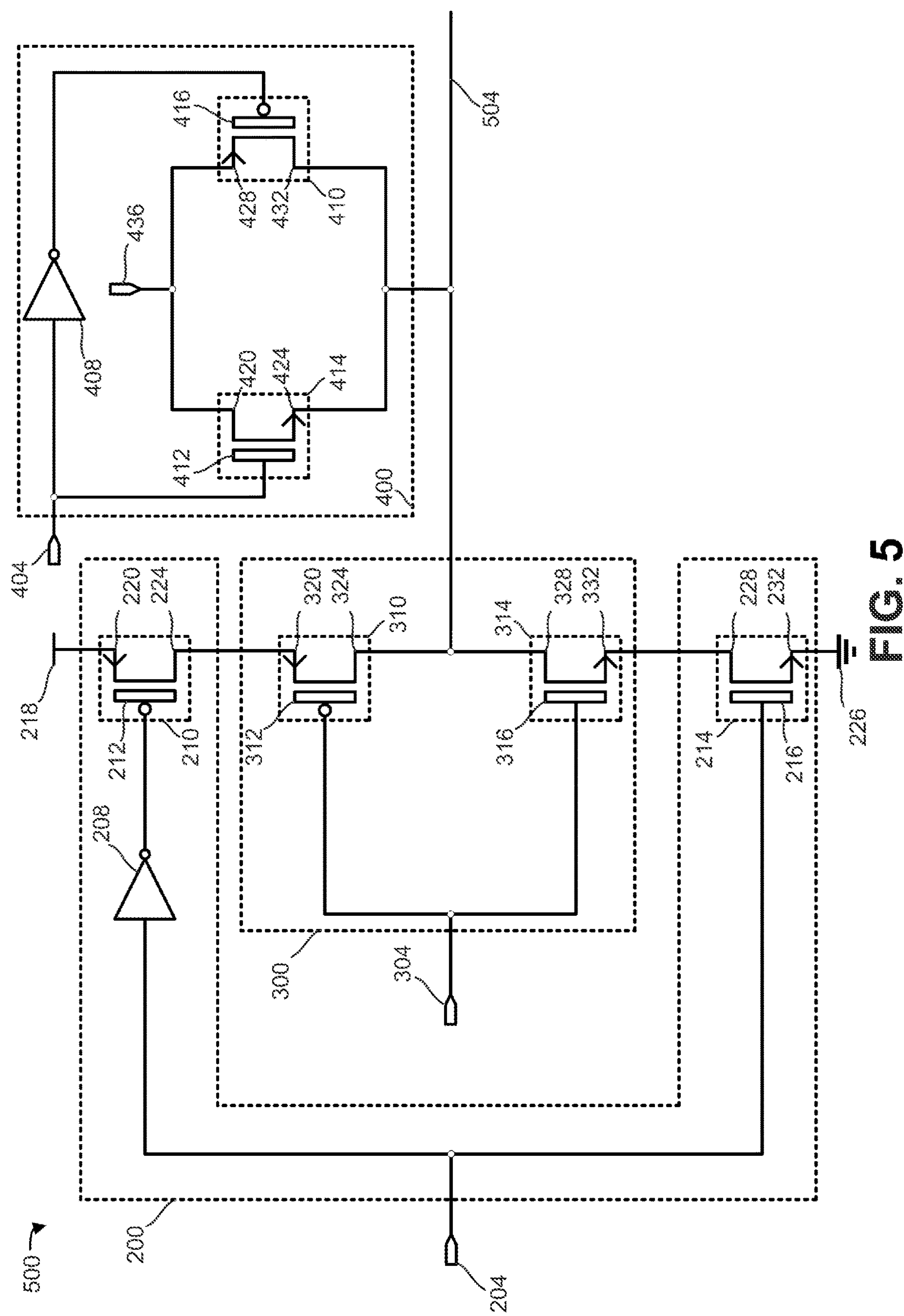
FIG. 5 illustrates a circuit diagram of a transmitter circuit, according to embodiments of the present disclosure.

FIG. 5 illustrates a circuit diagram of a transmitter circuit 500, according to embodiments of the present disclosure. Transmitter circuit 500 includes transmission control circuit 200, inverter circuit 300, and idle circuit 400. Transmitter circuit 500 further includes data input 304 and data output 504. Data input 304 is configured to receive an input data signal including binary data. Data output 504 is configured to transmit an encoded data signal including the logical inverse of the binary data included in the input data signal received at data input 304. Transmitter circuit 500 further includes first control signal input 204 and second control signal input 404. First control signal input 204 and second control signal input 404 are configured to receive non-overlapping control signals such that when the control signal received at first control signal input 204 is active, the control signal received at second control signal input 404 is inactive, and when the control signal received at second control signal input 404 is active, the control signal received at first control signal input 204 is inactive.

Transmitter circuit 500 may be coupled with one or more other transmitter circuits as part of a larger three-level encoding transmitter. For example, transmitter circuit 500 may be one of two transmitter circuits configured to receive an input data signal including binary data and generate a three-level encoded DC balanced differential signal including the binary data from the input data signal. In some embodiments, data output 504 is coupled with a receiver circuit configured to receive and decode the encoded data signal from data output 504. In some embodiments, data output 504 is capacitively coupled with a receiver circuit.

The encoded data signal transmitted by data output 504 may include two logical levels and/or voltages corresponding to logical values included in the input data signal. As an example, for a binary data signal with logical '0' and logical '1', each differential signal may include a first voltage level for logical '0' and a second voltage level for logical '1'. Each differential signal may further include a third logical level and/or voltage when there is no data transmission. The third voltage level may be between the first and second voltage levels and/or may be a common mode voltage. The third voltage level may be selected to reduce and/or eliminate power consumption by transmitter circuit 500 when there is no data transmission.

Inverter circuit 300 includes p-type transistor 310 and n-type transistor 314. P-type transistor 310 includes gate 312, source 320, and drain 324. N-type transistor 314 includes gate 316, source 332, and drain 328. Gate 312 of p-type transistor 310 and gate 316 of n-type transistor are coupled together with data input 304. Drain 324 of p-type transistor 310 and drain 328 of n-type transistor 314 are coupled together with data output 504.

Inverter circuit 300 is configured to receive an input data signal including binary data at data input 304 and generate an encoded output data signal including the logical inverse of the binary data included in the input data signal, as described above. For example, upon receiving a logical '1', inverter circuit 300 is configured to produce a logical '0', and upon receiving a logical '0', inverter circuit 300 is configured to produce a logical '1'. The encoded output data signal may represent logical '0' and logical '1' using a first voltage and a second voltage, as described above.

Transmission control circuit 200 includes inverter 208, p-type transistor 210, and n-type transistor 214. Inverter 208 is configured to receive a signal at an input of inverter 208 and generate an inverse of the signal at an output. For example, when inverter 208 receives a high voltage, it will output a low voltage, and when inverter 208 receives a low voltage, it will output a high voltage.

P-type transistor 210 includes gate 212, source 220, and drain 224. N-type transistor 214 includes gate 216, source 232, and drain 228. An input of inverter 208 and gate 216 of n-type transistor 214 are coupled together with first control signal input 204. An output of inverter 208 is coupled with gate 212 of p-type transistor 210. Source 220 of p-type transistor 210 is coupled with voltage source 218 configured to provide a predetermined voltage level. Source 232 of n-type transistor is coupled with a source of ground 226. Drain 224 of p-type transistor 210 is coupled with source 320 of p-type transistor 310. Drain 228 of n-type transistor 214 is coupled with source 332 of n-type transistor 314.

The control signal received at first control signal input 204 controls when p-type transistor 210 and n-type transistor 214 are in an 'on' state or an 'off' state. For example, when the control signal is active, and/or at a maximum voltage, p-type transistor 210 and n-type transistor 214 are in the 'on' state, and transmission control circuit 200 may be considered active. When p-type transistor 210 is in the 'on' state, electricity may flow from voltage source 218, through p-type transistor 210, to source 320 of p-type transistor 310. Similarly, when n-type transistor 214 is in the 'on' state, electricity may flow from source 332 of n-type transistor 314, through n-type transistor 214, to the source of ground 226. Therefore, when transmission control circuit 200 is active, transmission control circuit 200 causes inverter circuit 300 to transmit the encoded data signal to data output 504 of transmitter circuit 500.

As another example, when the control signal is inactive, and/or at a minimum voltage, p-type transistor 210 and n-type transistor 214 are in the 'off' state, and transmission control circuit 200 may be considered inactive. When transmission control circuit 200 is inactive, electricity will not flow between source 320 of p-type transistor 310 and voltage source 218. Likewise, when transmission control circuit 200 is inactive, electricity will not flow between source 332 of n-type transistor 314 and the source of ground 226. Therefore, when transmission control circuit 200 is inactive, transmission control circuit 200 deactivates inverter circuit 300.

Idle circuit 400 includes inverter 408, p-type transistor 410, and n-type transistor 414. Idle circuit 400 further includes idle voltage input 436 configured to receive an idle voltage. The idle voltage may be a common mode voltage, as described above. The idle voltage level may be selected to reduce and/or eliminate power consumption by transmitter circuit 500 when there is no data transmission. Inverter 408 is configured to receive a signal at an input of inverter 408 and generate an inverse of the signal at an output. For example, when inverter 408 receives a high voltage, it will output a low voltage, and when inverter 408 receives a low voltage, it will output a high voltage.

P-type transistor 410 includes gate 416, source 428, and drain 432. N-type transistor 414 includes gate 412, source 424, and drain 420. An input of inverter 408 and gate 412 of n-type transistor 414 are coupled together with second control signal input 404. An output of inverter 408 is coupled with gate 416 of p-type transistor 410. Source 428 of p-type transistor 410 and drain 420 of n-type transistor 414 are coupled together with idle voltage input 436. Drain 432 of p-type transistor 410 and source 424 of n-type transistor 414 are coupled together with data output 504 of transmitter circuit 500.

The control signal received at second control signal input 404 controls when p-type transistor 410 and n-type transistor 414 are in an 'on' state or an 'off' state. For example, when the control signal is active, and/or at a maximum voltage, p-type transistor 410 and n-type transistor 414 are in the 'on' state. When p-type transistor 410 and n-type transistor 414 are both in the 'on' state, electricity may flow from idle voltage input 436 through p-type transistor 410 and/or n-type transistor 414 to data output 504. The combination of p-type transistor 410 and n-type transistor 414 may enable idle circuit 400 to transmit the idle voltage via data output 504 regardless of the past voltage transmitted via data output 504 by inverter circuit 300.

Figure 6:
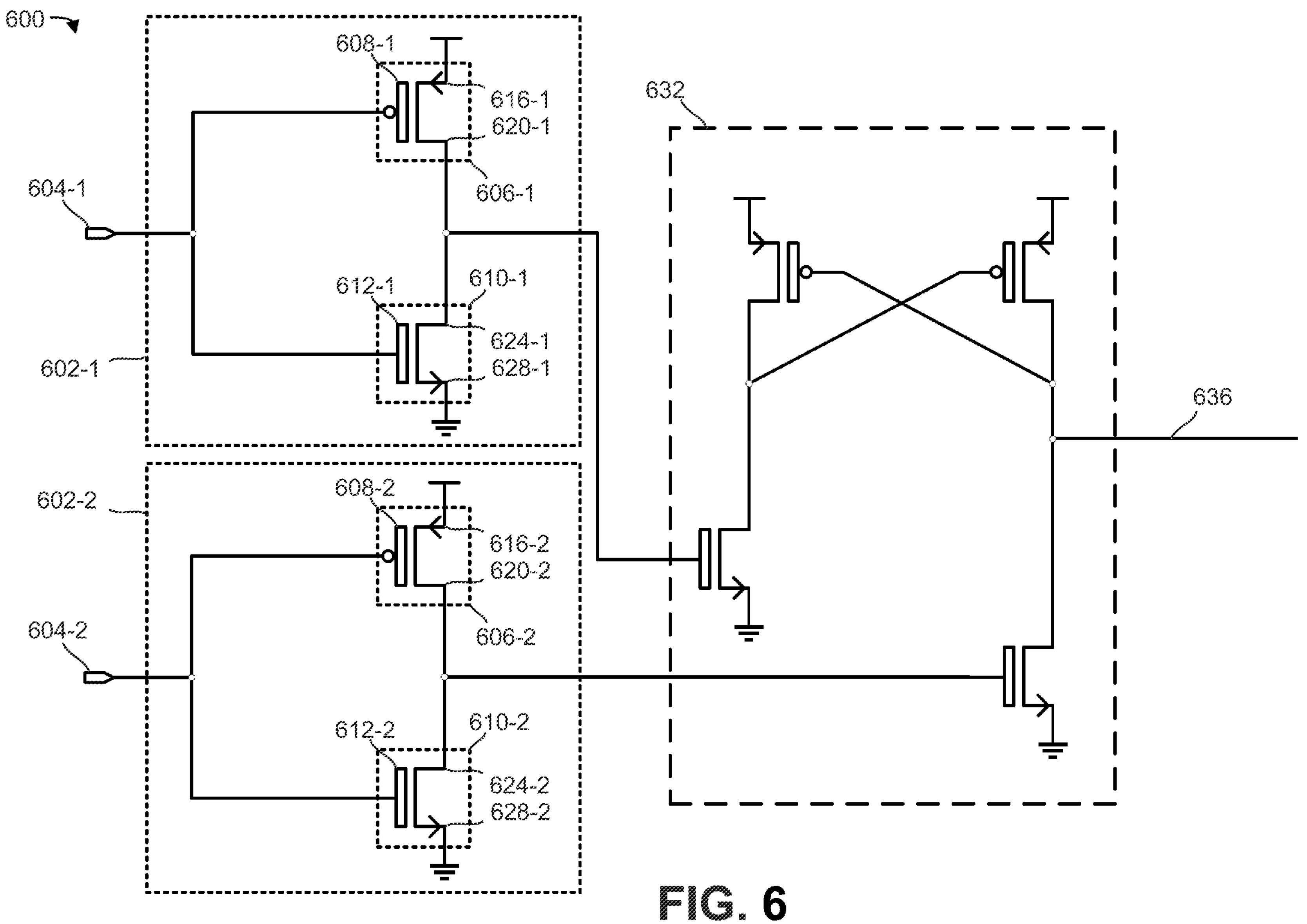
FIG. 6 illustrates a circuit diagram of a three-level decoding receiver, according to embodiments of the present disclosure.

FIG. 6 illustrates a circuit diagram of a three-level decoding receiver 600, according to embodiments of the present disclosure. Three-level decoding receiver 600 includes inverter circuits 602 and differential-to-single ended level-up voltage shifter 632. Three-level decoding receiver 600 further includes encoded data inputs 604-1 and 604-2 and decoded data output 636. Encoded data inputs 604-1 and 604-2 are configured to receive a three-level encoded differential signal including binary data. Decoded data output 636 is configured to transmit a single ended signal including the binary data received by encoded data inputs 604-1 and 604-2.

In some embodiments, encoded data inputs 604-1 and 604-2 of three-level decoding receiver 600 may be electromagnetically coupled with a three-level encoding transmitter, as described above. For example, encoded data inputs 604-1 and 604-2 may be capacitively coupled with outputs of a three-level encoding transmitter. The three-level decoding transmitter may be configured to receive an input data signal including the binary data and encode it in the three-level encoded differential signal received by three-level decoding receiver 600.

Three-level decoding receiver 600 may be a component of a neural implant and/or neural implant system including a neural implant. For example, one or more processors configured to generate digital data from neuronal impulses sensed within a human brain may transmit the digital data to a three-level encoding transmitter. The three-level encoding transmitter may then transmit an encoded version of the digital data to three-level decoding receiver 600. Three-level decoding receiver 600 may be part of a data receiving device outside the human. Alternatively, three-level decoding receiver 600 may be part of a separate implant in another location within the human's body.

The differential encoded data signal received at encoded data inputs 604-1 and 604-2 by three-level encoding receiver 600 may include two differential signals configured to be DC-balanced such that the differential signals have opposite polarity relative to a common mode voltage. For example, a first differential signal may be received via first encoded data input 604-1 while a second differential signal is received via second encoded data input 604-2. Each differential signal may include two logical levels and/or voltages corresponding to logical values included in the data signal. As an example, for a binary data signal with logical '0' and logical '1', each differential signal may include a first voltage level for logical '0' and a second voltage level for logical '1'. Each differential signal may further include a third logical level and/or voltage when there is no data transmission. The third voltage level may be between the first and second voltage levels and/or may be a common mode voltage. The third voltage level for each differential signal may be selected to reduce and/or eliminate power consumption by three-level encoding receiver 600 when there is no data transmission to receive.

As illustrated, inverter circuits 602-1 and 602-2 include first inverter circuit 602-1 and second inverter circuit 602-2. Encoded data input 604-1 is coupled with first inverter circuit 602-1 and encoded data input 604-2 is coupled with second inverter circuit 602-2. Inverter circuits 602-1 and 602-2 further include p-type transistors 606-1 and 606-2 and n-type transistors 610-1 and 610-2. First inverter circuit 602-1 includes some or all of the same components as second inverter circuit 602-2. For example, first inverter circuit includes p-type transistor 606-1 and n-type transistor 610-1, while second inverter circuit 602-2 includes p-type transistor 606-2 and n-type transistor 610-2. P-type transistors 606-1 and 606-2 include gates 608-1 and 608-2, sources 616-1 and 616-2, and drains 620-1 and 620-2. N-type transistors 610-1 and 610-2 include gates 612-1 and 612-2, sources 628-1 and 628-2, and drains 624-1 and 624-2.

In some embodiments, three-level decoding receiver 600 includes more than two inverter circuits 602-1 and 602-2. For example, three-level decoding receiver 600 may include 4, 6, 8, or any suitable even number of inverter circuits 602-1 and 602-2. Each pair of inverter circuits may be configured to receive a separate three-level encoded differential signal including binary data.

Inverter circuits 602-1 and 602-2 are configured to receive a differential encoded data signal and produce a decoded data signal. For example, first inverter circuit 602-1 may be configured to receive a first encoded data signal including binary data and produce a first decoded data signal including the logical inverse of the first encoded data signal. As another example, second inverter circuit 602-2 may be configured to receive a second encoded data signal including the logical inverse of the first encoded data signal and produce a second decoded data signal including the logical inverse of the first decoded data signal.

Gates 608-1 and 608-2 of p-type transistors 606-1 and 606-2 and gates 612-1 and 612-2 of n-type transistors 610-1 and 610-2 are coupled together with encoded data inputs 604-1 and 604-2. Sources 616-1 and 616-2 of p-type transistors 606-1 and 606-2 are coupled with a voltage source. Sources 628-1 and 628-2 of n-type transistors 610-1 and 610-2 are coupled with a source of ground. Drains 620-1 and 620-2 of p-type transistors and drains 624-1 and 624-2 of n-type transistors 610-1 and 610-2 are coupled together at an output of inverter circuits 602-1 and 602-2.

In some embodiments, there is a size difference between p-type transistors 606-1 and 606-2 and n-type transistors 610-1 and 610-2. For example, p-type transistors 606-1 and 606-2 may be larger than n-type transistors 610-1 and 610-2. The size of p-type transistors 606-1 and 606-2 and the size of n-type transistors 610-1 and 610-2 may be different by a factor of at least five. In some embodiments, the size difference is selected in order to reduce the power consumed by inverter circuits 602-1 and 602-2 when the encoded data signal received at encoded data inputs 604-1 and 604-2 is at the third voltage level. For example, p-type transistors 606-1 and 606-2 and n-type transistors 610-1 and 610-2 may be sized such that when the voltage level of the encoded data signal is between the first voltage level representing logical '0' and the second voltage level representing logical '1', electricity will not flow from the voltage source, through p-type transistors 606-1 and 606-2 and n-type transistors 610-1 and 610-2, to the source of ground. When electricity is unable to flow from the voltage sources through p-type transistors 606-1 and 606-2 and n-type transistors 610-1 and 610-2, inverter circuits 602-1 and 602-2 are inactive.

When coupled and configured as described above, inverter circuits 602-1 and 602-2 will generate a data signal that is the logical inverse of the encoded data signal received at encoded data inputs 604-1 and 604-2. For example, when the encoded data signal received at either of encoded data inputs 604-1 and 604-2 is at the minimum voltage, n-type transistors 610-1 and 610-2 will be in an 'off' state, thereby limiting the current that can flow from the outputs of inverter circuits 602-1 and 602-2 to the sources of ground. On the other hand, p-type transistors 606-1 and 606-2 will be in an 'on' state, allowing much more current to flow from the voltage sources to the outputs of inverter circuits 602-1 and 602-2 resulting in a small voltage drop from the voltage source to the outputs. This small voltage drop will register as a high voltage, the inverse of the encoded data signal received at encoded data inputs 604-1 and 604-2.

As another example, when the input signal received at encoded data inputs 604-1 and 604-2 is at the maximum voltage, p-type transistors 606-1 and 606-2 will be in the 'off' state, thereby limiting the current that can flow from the voltage sources to the outputs of inverter circuits 602-1 and 602-2. On the other hand, n-type transistors 610-1 and 610-2 will be in the 'on' state, resulting in a small voltage drop from the outputs of inverter circuits 602-1 and 602-2 to the sources of ground. This small voltage drop will register as a low voltage, the inverse of the encoded data signal received at encoded data inputs 604-1 and 604-2.

The outputs of inverter circuits 602-1 and 602-2 are coupled with differential-to-single ended level-up voltage shifter 632. Differential-to-single ended level-up voltage shifter 632 includes one or more p-type transistors and one or more n-type transistors configured to receive a differential signal and generate a single-ended output signal. Differential-to-single ended level-up voltage shifter 632 may be configured to generate a single-ended output signal with a greater voltage swing and/or amplitude than the differential input signals. For example, when the differential input signal amplitudes are unable to drive digital logic circuits, differential-to-single ended level-up voltage shifter 632 may be configured to generate a single-ended output signal with a sufficient amplitude to drive digital logic circuits.

It should be appreciated that a brain implant or other system and a respective control system for the brain implant can have one or more microprocessors/processing devices that can further be a component of the overall apparatuses. The control systems are generally proximate to their respective devices, in electronic communication (wired or wireless) and can also include a display interface and/or operational controls configured to be handled by a user to monitor the respective systems, to change configurations of the respective systems, and to operate, directly guide, or set programmed instructions for the respective systems, and sub-portions thereof. Such processing devices can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

In some embodiments, the apparatuses and/or methods of the present disclosure can be used in connection with neurosurgical techniques. However, one skilled in the art would recognize that neurosurgical techniques are a non-limiting application, and the systems and/or methods of the present disclosure can be used in connection with any biological tissue. Biological tissue can include, but is not limited to, the brain, muscle, liver, pancreas, spleen, kidney, bladder, intestine, heart, stomach, skin, colon, and the like.

The systems and/or methods of the present disclosure can be used on any suitable multicellular organism including, but not limited to, invertebrates, vertebrates, fish, bird, mammals, rodents (e.g., mice, rats), ungulates, cows, sheep, pigs, horses, non-human primates, and humans. Moreover, biological tissue can be ex vivo (e.g., tissue explant), or in vivo (e.g., the method is a surgical procedure performed on a patient).

The teachings of the invention provided herein can be applied to other systems and apparatuses, not necessarily the system or apparatus described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A three-level encoding transmitter, comprising:

a non-overlapping control signal generator configured to generate a first control signal and a second control signal, wherein when the first control signal is active, the second control signal is inactive, and when the second control signal is active, the first control signal is inactive;

a data input configured to receive an input data signal including binary data; and a first transmitter circuit comprising:

an inverter circuit configured to receive the input data signal and generate a first encoded data signal including a first voltage for logical one and a second voltage for logical zero, wherein the first encoded data signal is the logical inverse of the binary data;

a transmission control circuit configured to receive the first control signal from the non-overlapping control signal generator and control the inverter circuit based on the first control signal, wherein when the first control signal is active, the transmission control circuit causes the inverter circuit to transmit the first encoded data signal to an output of the first transmitter circuit, and when the first control signal is inactive, the transmission control circuit deactivates the inverter circuit; and an idle circuit configured to receive the second control signal from the non-overlapping control signal generator and generate an idle voltage between the first voltage and the second voltage based on the second control signal, wherein when the second control signal is active, the idle circuit transmits the idle voltage to the output of the first transmitter circuit.

2. The three-level encoding transmitter of claim 1, further comprising:

a second transmitter circuit configured to receive the input data signal and generate a second encoded data signal, wherein the second encoded data signal has an opposite polarity to the first encoded data signal relative to a common mode voltage.

3. The three-level encoding transmitter of claim 2, wherein the input data signal is inverted prior to being received by the second transmitter circuit.

4. The three-level encoding transmitter of claim 2, further comprising:

a receiver circuit coupled with the output of the first transmitter circuit and configured to reproduce the binary data at an output of the receiver circuit, wherein when the receiver circuit receives the idle voltage, the receiver circuit is inactive.

5. The three-level encoding transmitter of claim 4, wherein the receiver circuit is capacitively coupled with the first transmitter circuit.

6. The three-level encoding transmitter of claim 4, wherein the receiver circuit comprises:

a first inverter circuit coupled with the output of the first transmitter circuit and configured to produce a first decoded data signal, wherein the first decoded data signal is the logical inverse of the first encoded data signal;

a second inverter circuit coupled with an output of the second transmitter circuit and configured to produce a second decoded data signal, wherein the second decoded data signal is the logical inverse of the second encoded data signal; and a differential-to-single ended level-up voltage shifter configured to receive the first and second decoded data signals and transmit an output data signal to the output of the receiver circuit, wherein the output data signal is logically equivalent to the binary data of the input data signal.

7. The three-level encoding transmitter of claim 1, wherein the inverter circuit comprises:

a first p-type transistor and a first n-type transistor, wherein a drain of the first p-type transistor is connected to a drain of the first n-type transistor at an output of the inverter circuit, and the data input is connected to a gate of the first p-type transistor and a gate of the first n-type transistor.

8. The three-level encoding transmitter of claim 7, wherein the transmission control circuit comprises:

a second p-type transistor, wherein a drain of the second p-type transistor is connected to a source of the first p-type transistor;

a second n-type transistor, wherein a drain of the second n-type transistor is connected to a source of the first n-type transistor and a gate of the second n-type transistor receives the first control signal; and an inverter configured to transmit an inverted first control signal to a gate of the second p-type transistor.

9. The three-level encoding transmitter of claim 8, wherein the first and second p-type transistors and the first and second n-type transistors are each metal-oxide-semiconductor field-effect transistors.

10. The three-level encoding transmitter of claim 1, wherein the idle circuit comprises:

an inverter configured to output an inverted second control signal;

a first p-type transistor, wherein a source of the first p-type transistor is connected to a source of the idle voltage, a drain of the first p-type transistor is connected to the output of the first transmitter circuit, and a gate of the first p-type transistor receives the inverted second control signal; and a first n-type transistor, wherein a drain of the first p-type transistor is connected to the source of the idle voltage, a source of the first n-type transistor is connected to the output of the first transmitter circuit, and a gate of the first n-type transistor receives the second control signal.

11. The three-level encoding transmitter of claim 1, wherein the input data signal is received from a neural implant.

12. A three-level decoding receiver, comprising:

a first input configured to receive a first encoded data signal including a first voltage level, a second voltage level, and a third voltage level, the second voltage level being less than the third voltage level and more than the first voltage level; and a first inverter circuit coupled with the first input and configured to generate a first decoded data signal from the first encoded data signal, wherein when the first encoded data signal is the first voltage level, the first decoded data signal represents a logical one, when the first encoded data signal is the third voltage level, the first decoded data signal represents a logical zero, and when the first encoded data signal is the second voltage level, the first inverter circuit is inactive.

13. The three-level decoding receiver of claim 12, further comprising:

a second input configured to receive a second encoded data signal, wherein the second encoded data signal has an opposite polarity to the first encoded data signal relative to a common mode voltage;

a second inverter circuit coupled with the second input and configured to generate a second decoded data signal from the second encoded data signal, wherein the second decoded data signal is the logical inverse of the first decoded data signal and when the first decoded data signal is inactive, the second inverter circuit is inactive; and a differential-to-single ended level-up voltage shifter configured to receive the first and second decoded data signals and transmit an output data signal to an output of the three-level decoding receiver.

14. The three-level decoding receiver of claim 13, wherein the first encoded data signal and the second encoded data signal are direct current balanced.

15. The three-level decoding receiver of claim 13, further comprising:

a transmitter circuit capacitively coupled with the first and second inputs and configured to generate the first and second encoded data signals.

16. The three-level decoding receiver of claim 15, wherein the transmitter circuit comprises:

a non-overlapping control signal generator configured to generate a first control signal and a second control signal, wherein when the first control signal is active, the second control signal is inactive, and when the second control signal is active, the first control signal is inactive;

a data input configured to receive an input data signal including binary data;

a first transmitter circuit configured to generate a first encoded data signal based on the input data signal, wherein the first encoded data signal is the logical inverse of the binary data and when the first control signal is active, the first transmitter circuit transmits at either the first voltage level or the third voltage level, and when the second control signal is active, the first transmitter circuit transmits the second voltage level; and a second transmitter circuit configured to generate the second encoded data signal based on the input data signal, wherein the second encoded data signal is the logical equivalent of the binary data and when the first control signal is active, the second transmitter circuit transmits at either the first voltage level or the third voltage level, and when the second control signal is active, the second transmitter circuit transmits the second voltage level.

17. The three-level decoding receiver of claim 12, wherein the first inverter circuit comprises:

a p-type transistor and an n-type transistor, wherein a drain of the p-type transistor is connected to a drain of the n-type transistor at an output of the first inverter circuit, and a gate of the p-type transistor and a gate of the n-type transistor are connected to the first input; and wherein a size of the p-type transistor is not equal to a size of the n-type.

18. The three-level decoding receiver of claim 17, wherein the size of the p-type transistor and the size of the n-type transistor are different by a factor of at least five.

19. The three-level decoding receiver of claim 12, wherein when the first inverter circuit is inactive, the first inverter circuit consumes zero power.

20. A three-level encoding apparatus comprising:

a non-overlapping control signal generator configured to generate a first control signal and a second control signal, wherein when the first control signal is active, the second control signal is inactive, and when the second control signal is active, the first control signal is inactive;

a data input configured to receive an input data signal including binary data;

a first inverter circuit configured to receive the input data signal and generate a first encoded data signal including a first voltage for logical one and a second voltage for logical zero, wherein the first encoded data signal is the logical inverse of the binary data;

an input inverter configured to receive the input data signal and generate an inverse input data signal;

a second inverter circuit configured to receive the inverse input data signal and generate a second encoded data signal including the first voltage for logical one and the second voltage for logical zero, wherein the second encoded data signal is logically equivalent to the binary data;

a first transmission control circuit configured to receive the first control signal from the non-overlapping control signal generator and control the first inverter circuit based on the first control signal, wherein when the first control signal is active, the first transmission control circuit causes the first inverter circuit to transmit the first encoded data signal to a first output, and when the first control signal is inactive, the first transmission control circuit deactivates the first inverter circuit;

a second transmission control circuit configured to receive the first control signal from the non-overlapping control signal generator and control the second inverter circuit based on the first control signal, wherein when the first control signal is active, the second transmission control circuit causes the second inverter circuit to transmit the second encoded data signal to a second output, and when the first control signal is inactive, the second transmission control circuit deactivates the second inverter circuit;

a first idle circuit configured to receive the second control signal from the non-overlapping control signal generator and generate an idle voltage between the first voltage and the second voltage based on the second control signal, wherein when the second control signal is active, the first idle circuit transmits the idle voltage to the first output;

a second idle circuit configured to receive the second control signal from the non-overlapping control signal generator and generate the idle voltage, wherein when the second control signal is active, the second idle circuit transmits the idle voltage to the second output;

a third inverter circuit capacitively coupled with the first output and configured to generate a first decoded data signal from the first encoded data signal, wherein when the first encoded data signal is the first voltage, the first decoded data signal represents a logical zero, when the first encoded data signal is the second voltage, the first decoded data signal represents a logical one, and when the first encoded data signal is the idle voltage, the third inverter circuit is inactive;

a fourth inverter circuit capacitively coupled with the second output and configured to generate a second decoded data signal from the second encoded data signal, wherein when the second encoded data signal is the first voltage, the second decoded data signal represents a logical zero, when the second encoded data signal is the second voltage, the second decoded data signal represents a logical one, and when the second encoded data signal is the idle voltage, the fourth inverter circuit is inactive; and a differential-to-single ended level-up voltage shifter configured to receive the first and second decoded data signals and transmit an output data signal to a third output, wherein the output data signal is logically equivalent to the binary data of the input data signal.

* * * * *